US006962653B2

(12) United States Patent
Jeong

(10) Patent No.: US 6,962,653 B2
(45) Date of Patent: Nov. 8, 2005

(54) AUTOTHERMAL AEROBIC DIGESTION SYSTEM HAVING CLOSED DEFOAMING SYSTEM

(76) Inventor: Charlie Jeong, #44-3240 E. 58th Ave., Vancouver B.C. (CA) V5S 3T2

( * ) Notice: Subject to any disclaimer, the term of this patent is extended or adjusted under 35 U.S.C. 154(b) by 36 days.

(21) Appl. No.: 10/807,234

(22) Filed: Mar. 24, 2004

(65) Prior Publication Data
US 2005/0092670 A1 May 5, 2005

(30) Foreign Application Priority Data
Nov. 1, 2003 (KR) ............... 10-2003-0077112

(51) Int. Cl.$^7$ ........................... B01D 19/00; C02F 3/12
(52) U.S. Cl. ............... 210/103; 210/197; 210/194; 210/209; 210/220
(58) Field of Search ............... 210/103, 197, 210/194, 209, 220

(56) References Cited

U.S. PATENT DOCUMENTS

| 4,997,660 A | * | 3/1991 | Wittler ........................ 426/17 |
| 5,783,089 A | | 7/1998 | Anderson et al. |
| 5,928,493 A | | 7/1999 | Morkovsky et al. |
| 6,660,164 B1 | * | 12/2003 | Stover ........................ 210/612 |
| 2003/0087969 A1 | * | 5/2003 | Slone et al. ................. 516/113 |

* cited by examiner

Primary Examiner—Chester T. Barry
(74) Attorney, Agent, or Firm—Oliff & Berridge, PLC

(57) ABSTRACT

Disclosed is an autothermal aerobic digestion system having closed defoaming system. The system according to the present invention completely controls light and heavy foam by using a series of aeration venturi and defoamer venturi and a foam collector pipe. According to this invention, an internal pressure of a digester is elevated by using inversely troublesome foam, so pathogenic microorganisms is destroyed. In addition to, by using simple venturi, an air inlet, defoaming and a recycling of a warm air can be achieved.

3 Claims, 2 Drawing Sheets

AUTOTHERMAL AEROBIC DIGESTION SYSTEM HAVING CLOSED DEFOAMING SYSTEM

BACKGROUND OF THE INVENTION

1. Field of the Invention

The present invention relates to an autothermal aerobic digestion system for treatment bio-solid containing wastewater streams and industrial liquid organic wastewaters, etc., and more particularly, to an autothermal aerobic digestion system having closed defoaming system.

2. Description of the Related Art

Wastewater streams in the advanced society contain a variety of human derived bio-solid compounds. A variety of treatment has been developed over many numerous years for the treatment of bio-solid containing liquid streams since those sewage streams contain various contaminants derived from mostly humans. Those contaminants are generally of organic compounds and numerous kinds of microorganisms including pathogenic organisms that are harmful to humans. However, conventional method for the treatment of bio-solid containing wastewater streams frequently fail to get rid of these concerned pathogenic microorganisms such as $E$ $coli$, $Salmonella$, enterovirus and certain protozoan organism, etc., even with heavy usage of chemicals, which sometimes entails unexpectedly casualty of innocent citizens. Accordingly, more efficient method for destroying pathogenic microorganisms such as so-called ATAD (Autothermal Thermophilic Aerobic Digestion) have been developed and applied in wastewater treatment and even fertilizer manufacture as well.

In addition to the chemical and/or biological removal aspect of pathogenic microorganisms, conventional wastewater treatment processes result in large amount of sludge that are dumped or land filled or sometimes sold as soil additives and fertilizer due to its nutrient aspects. However, the bigger wastewater treatment facility the more sludge generated causing handling and tricking problem, requiring more intensive management, raising liability issue in disposal and consequently entailing more financial expense. This sometimes requires extremely cost, since construction of whole treatment facility is necessary for bigger land and longer construction time. Therefore, since land is becoming more and more expensive in big metro city, special process and method have been developed with respect to better efficacy of using small land and quicker processing time of bio-solid containing wastewaters or bio-wastes from industries. However, peak time including particularly summer flood in the city forces the existing treatment plant to release wastewaters in partly untreated condition that expose public to dangerous health situation.

The sludge resulted from conventional wastewater treatment process is basically organic materials but also contains the same species of pathogenic bacteria as can be found in the untreated wastewaters as well. Those microflora include $E$ $coli$, $Salmonella$ and bacteria responsible for cholera, typhoid fever bacillary, brucellosis, etc. In addition, the sludge contains other group of thermophilic microflora that are not harmful to humans in nature and a certain group of thermophilic microorganisms. They could be aerobic or anaerobic organisms in nature. This invention relates with the use of thermophilic aerobic microorganisms.

The bio-solid or organic waste liquid streams in general term contain a variety of group of organic compounds that could be utilized or digested by aerobic microflora in bio-solid materials themselves that are of major organism in the system of this invention. Of the wide spectrum of aerobic organism are bacteria that thrive within thermophilic temperature ranging from 50° C. to 75° C. These organisms are generally not harmful to humans in nature. Of the variable group of organism in bio-solid materials are mesophilic microorganisms that are referred as pathogenic due to their active temperature range at about 37° C. that is around normal temperature of human body. The concern on the removal of these mesophilic organisms are becoming public issue and accordingly government regulatory body becomes more aware of regulations in terms of level of pathogenic organisms in the treated wastewater and the resulting sludge as well.

When bio-solid containing wastewater streams are treated in insulated reactor under heavy aerobic condition, as many others already discovered, the temperature of the reactor increases by exothermic reaction with oxygen. As temperature reaches mesophilic temperature range of 25° C. to 37° C., the pathogenic microorganisms begin to die, which is one of the major advantages of autothermal aerobic digestion system over conventional treatment method of bio-solid waste streams. The heat could be from external source such as electric heater and destroys all of the pathogenic organisms but it is very energy, cost intensive and not economical.

Another advantage of the autothermal aerobic digestion system is that the process generates itself heat without external heating source during autothermal process where the number of thermophilic microorganism grow and their exoenzyme activity increases, which eventually break down much of the organic compounds of the bio-solid materials in the waste streams at higher speed than conventional aerobic or even anaerobic treatment processes. The resulting amount of sludge becomes much lower than that produced by regular process mostly running at room temperature. The reaction of thermophilic anaerobic treatment system is even slower. Therefore, it could be concluded that the autothermal aerobic digestion system produces much less amount of sludge due to fast and efficient break-down of bio-solid materials to liquid status and reaches more than 99% of death rate of pathogen organism.

The reaction of the autothermal aerobic digestion system (or normally called ATAD system) in the industry of bio-solid containing wastewater stream treatment the thermophilic condition of the process generates foam. There could be theoretically and practically two types of foam in the digestion process; mechanical foam and biological foam. Mechanical foam relates with mechanical agitation of high viscosity waste streams caused by action of aerator or blender in the reactor. The fine bubbles by aerator of the thermophilic treatment process produce mechanical foam out of the liquid of viscosity at even ambient temperature before exothermal process takes over. In the mean time as exothermal reaction by thermophilic bacteria with the help of plentiful oxygen takes over in the reactor the temperature starts going up during which process a population of a certain group of microorganism at a certain temperature grow and become dominant in the reactor. However, as temperature continues to go up the particular group of microorganism starts dying away and another new group of microorganism takes over and becomes dominant again. This symptom continues to repeat until the temperature of the reactor reaches to its absolute limit of temperature when bio-solid nutrients of bacteria are consumed and become not available any more. Then exothermic reaction terminates and accordingly temperature drops as well.

Of the two types of foam is the biological foam that makes most of researches in wastewater treatment industry more interested since it causes troubles in actual operation. Proteins of dead bacteria generated through cell lysis that could not survive a certain temperature mostly cause the biological foam with help of mechanical agitation action by blender or aerator. Therefore, the biological foam forms at any time without warning sign depending upon the condition of thermophilic treatment process. Strength and amount of foam varies depending upon conditions such as types of bio-solid raw materials in the wastewater streams and their concentration, species of thermophilic microflora involved and temperature profile during the whole process.

The troubles caused by foam include 1) discontinuation of treatment process, 2) loss of bio-solid liquid streams through bypass, 3) contamination of surroundings, 4) shortened life expectancy of mechanical parts of reactor, 5) difficult situation to control major factors such as pH, temperature, oxidation-reduction value, aeration level, motor speed, etc due to the foam, 6) more extended period of whole process affecting adversely continuous automatic treatment system than scheduled.

Mechanical defoaming systems such as rotating blade and liquid defoamer using its own bio-solid liquid waste streams or even tap water have been introduced for years. The fundamental of those conventional defoaming apparatus is to physically rupture foam bubble that converts foam to liquid status. It is pretty effective with light and low amount of foam but not with heavy and strong foam. Therefore, the results are frequently considered unsatisfactory and those mechanical defoamers require high maintenance, high energy cost and more frequent examination of the apparatus. Particularly high maintenance such as periodic replacement of moving parts such as blade and motor, periodic procedure due to severe erosion problem is of major concerns.

SUMMARY OF THE INVENTION

Therefore, the present invention has been made to solve the above problems, and it is an object of the present invention to provide an extremely simple and efficient autothermal aerobic digestion system having closed defoaming system in autothermal aerobic digestion process that is being employed in wastewater treatment process and fertilizer manufacturing process.

It is another object of the invention to provide a total closed autothermal aerobic digestion system without allowing even one bubble of foam out of the digester apparatus.

The invention relates to a technique for efficient control of light and heavy foam generated during thermophilic digestion process using two or three, if necessary, separate regular venturi(Bernoulli) and accordingly for control of fresh air and recycled air intake where more than two venturi work as aeration and defoaming apparatus as well.

The invention found the system of new aeration and defoaming system requires easy maintenance due to the outer location of venturi rather than inner location. The total closed system of the invention could get rid of conventional odor removing device such as air scrubber due to perfect recycling of warm air and foam. The internal pressure built by the total closed system may be helpful to kill pathogenic microorganism much quicker than at atmosphere pressure. This new system will help existing autothermal aerobic treatment system in that it will break down bio-solid materials in the wastewater streams and bio-solid raw materials for fertilizer manufacture with improved efficiency of fast reaction time and with increased destroying rate of pathogenic organisms. The bio-solid raw materials may include any type of municipal wastewater, any type of industrial wastewater, any organic wastes such as animal manure, fish wastes, agriculture by-products and food wastes to make animal food, fish feed and fertilizer.

Venturi historically has been used in a variety of application including handling of agriculture chemical fertilizer. A variety of venturi has also been developed depending upon the purpose of application. Lately, jet air has been developed to more efficiently provide air into the thermophilic digester that is another type of old venturi. The conventional venturi is good in that it is readily available, easy make and very cost effective compared with the newly developed aerator and moreover its capability of aeration provides satisfactory results in terms of giving enough air for exothermal reaction to take place. The more volume of the bio-solid containing waste streams the more number of venturi could be added to the whole system.

About a couple of venturis may be required in order for about 1,000–5,000 gallon capacity of reactor to be fully aerated and to reach thermophilic temperature. The idea that one venturi used as aerator and the other venturi as a suction apparatus for foam flowing down through foam bypass under total closed system of reactor will basically satisfy aeration and defoaming purposes. However, the closed system is found to build up enormous amount of internal pressure enough to crack the lid or make the whole system leak. Therefore, three way fittings at an air intake of defoamer venturi was installed as shown in FIG. 2 making it possible for internal pressure released. This device allows internal pressure builds up slightly above atmosphere pressure. The hose connected to the air intake fitting is directed to a foam collecting pipe and the resulting extra foam bubbles and fresh air are sucked into aerator venturi or 3rd venturi.

A series of venturi with proper installation make it possible to totally seal and slightly pressurize the reactor prohibiting warm air going out to the atmosphere. In addition, 100% of foam is recycled and the surroundings of the reactor are free of mess requiring no need of foam collecting bucket, etc.

The recycled foam carries warms air, which eventually help keep the high temperature of, reactor affecting performance of treatment process. However, it has been known that recycled air does not provide enough air for thermophilic bacteria to generate exothermic reaction that may require more fresh air intake. The fresh air is found to drop the temperature of digester, which force operator to face with catch-22 situation in some situations. Therefore, it appears to be desirable for the treatment system to control the amount of recycled air and fresh air going into the reactor depending upon situation of operation. This simple incorporation of a series of venturi makes the ideal approach possible by adjusting the air valve of aeration venturi and defoamer venturi.

The internal pressure built up by this system may help increase the destroying rate of pathogenic microorganism and may help the autothermal aerobic system break down organic compounds in bio-solid containing waste streams at much faster speed. This would allow the whole thermophilic digestion system to complete each cycle of digestion earlier than scheduled making the system more economics. This system may also allow reducing the amount of final sludge at the end of digestion process that might help in sludge disposal. The internal pressure may get rid of any possible dead zones in the digester such as sample port, pH probe, ORP probe, inside top corners of the digester where exothermic heat does not transfer and leave the zones not fully pasteurized.

Comparing with an existing defoaming system of the conventional autothermal aerobic digestion system, this invention requires extremely low maintenance due to the fact that all major mechanical parts such as aeration and defoamer venturi including motor and pump are located outside of reactor rather than inside of reactor. Most of the conventional ATDT system may have to stop whole operation when aerators located ay the bottom of reactor are found malfunctioned or needs replacement and regular cleaning check-up. In addition, worker in charge may have to go inside through side hatch or through the lid of the digester that may expose the worker to possible danger. However, in case of malfunction of major parts of this system, particularly aerator and defoamer venturi, it becomes very easy to close the necessary valves and replace troubled parts requiring no need of interruption of operation. The venturis are much cheaper than any other types of aeration apparatus and are readily available.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Now, preferred embodiments of the present invention will be described in detail with reference to the annexed drawings.

As required, embodiments in detail of the invention are disclosed herein. However, it is to be understood that disclose of the embodiments are just exemplary of the invention that could be embodied in a variety of forms. Accordingly, specific structural and functional details disclosed herein are not to be interpreted as limiting, but merely as a basis for the claims and as a representative basis for instructing one skilled in the art to variously employ the present invention in virtually any approximately detailed structure.

The inventor contemplates that preferred embodiments of the invention will involve the use of general concept of autothermal aerobic digestion system (AADS) and particularly the use of conventional suction apparatus venturi.

Figure 1:
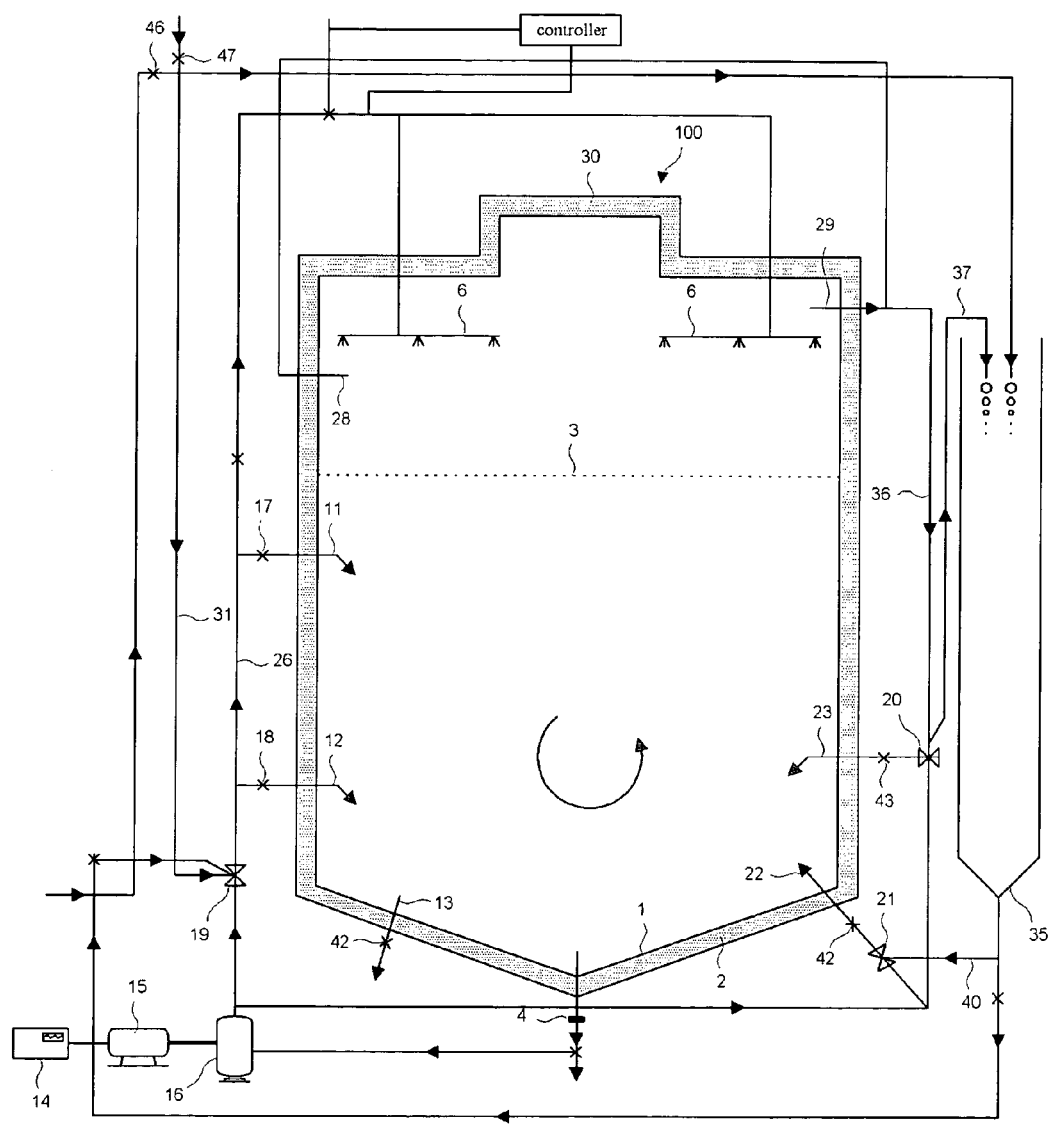
FIG. 1 is a cross sectional view of an autothermal aerobic digestion system according to the present invention.

FIG. 1 is a cross sectional view of an insulated autothermal aerobic digestion system for biological breakdown of bio-solid materials of wastewaters and liquid organic wastes and for pasteurization of pathogenic microorganisms in those waste streams. Here, the autothermal aerobic digestion system is a wastewater treatment system using an autothermal aerobic digestion.

Referring to FIG. 1, the digester 100 has a corn bottom shape 1 to help liquid waste streams in the digester mix better than with flat bottom shape of digester. The flat bottom shape digester generally produce poor mixing performance due to the 90° angle at the bottom that interrupt mixing action of bio-solid containing wastewaters unless extra action force is applied to the particular 90° angle area, which eventually wastes energy and loses efficiency of process. Accordingly, the round bottom shape would produce the best mixing performance than any other shapes. Inside of the digester 100 is totally free of any mechanical parts interrupting mixing performance except discharging nipples 11, 12, 23 for better mixing that eventually increase air saturation level, which speeds up exothermal reaction. Poor oxygen dissolution in the liquid caused by poor mixing might induce partly anaerobic digestion.

Basic operation of the digester 100 is as follows. A pump 16 driven by a motor 15 sucks the bio-solid containing liquid through a valve 4 and pumps it back to the digester 100 through the discharging nipples 11, 12, and 23. The discharging through the nipples 11, 12, and 13 completely mixes the whole bio-solid materials inside the digester 100. And this recycling process with the pump 16 generates aeration with the help of venturis 19, 20, 21, which continues until whole digestion process is completed. Foam usually takes place during the process as thermophilic reaction continues, fills up the digester 100, generates internal pressure and overflows through a foam bypass 36. A liquid defoaming apparatus 6 could break light foam but heavy foam might develop and overflows. The overflowing foam then would be sucked back into the digester 100 through the defoaming venturi 20, where extra heavy overflowing foam sometimes might develop and the extra overflowing foam generated at the defoamer venturi 20 is pushed up to a foam collector 35 by the internal pressure of the digester 100. The dripping extra foam into a pipe of the foam collector 35 would be recycled back to the digester 100 with fresh air as well through the aeration venturi 21, which eventually breaks extra foam, generates aeration and completes whole recycling process of foam without losing any bio-solid liquid materials and using conventional defoaming devices such as blades, etc.

Insulation 2 used as a wall of the digester 100 has at least 2" foam thickness depending upon the size of the digester 100. In case of the digester 100 of which capacity is more than 15,000 gallon, more than 6" insulation is required for preservation of high temperature. A lid 30 needs to be insulated and should be able to be completely sealed using latches or similar devices that could stand internal pressure built up by a new system. All other accessories attachments such as a suction valve 4, discharging valves 17, 18, 42 and the discharging nipple 23 must be tightly installed in order to resist internal pressure.

The motor 15 connected to the pump 16 is wired with a motor driver 14 that could control a speed of the motor affecting strength of mixing bio-containing waste liquor. The motor driver 14 may be connected to the personal computer for automatic computerization of the system.

The digester 100 could be filled with bio-containing wastewaters or liquid organic wastes up to a liquid level 3. The liquid level 3 is preferably around 75% of total capacity of the digester 100 for proper operation of treatment process. The liquid level 3 could be from 25% up to 85% depending upon the situation. Installation of two to four discharging nipples 11, 12, 22, 23 at different level makes it possible to make flexible control of liquid level that is not easy with other thermophilic treatment system of self-aspiration, etc.

When only below 50% of total capacity needs to be filled, then the discharging nipple 11 can be closed letting only the discharging nipples 12, 23 work with optional operation of the discharging nipple 22. When the digester 100 needs to be completely filled up to 85%, then all the discharging nipples 11, 12, 22, 23 could be open for better mixing of the bio-solid wastewaters.

The direction of the discharging nipples can be varied since their position and direction affect mixing efficiency and eventually influence digestion performance depending upon the viscosity or solid contents of the bio-solid waste streams in the digester 100. Decision on their position and direction should be properly made not ensure formation of a vortex. It has been observed that the vortex generally forms with low viscosity or low solid contents and vice versa. In either case the chance of formation of the vortex should be reduce since it may cause damage to the pump. It would be desirable if direction of the nipples could be controlled manually or automatically depending upon the circumstance of operation.

A length of the discharging nipples 11, 12, 22, 23 is important in that shorter length of the discharging nipple makes dispersed discharging pattern of bio-solid wastewaters and longer length of the discharging nipple makes straight and powerful pattern of bio-solid wastewaters. Decision on the length of the discharging nipples should be made depending upon a width and a height of the digester 100.

The venturis 19, 20, 21 shown in FIG. 1 are all located at the bottom of the digester 100 closer to the pump 16 and discharge the aerated liquid into the digester 100 by the pump 16 through the nipples 11, 12, 22, and 23. Generally, flow speed at closer position to the pump 16 is higher than that to less closer position of the pump 16. Therefore, the position of the venturi should be ideally closer to the pump so that more oxygen can disperse into liquid. If the venturi is located far off the pump then less pump power is transferred to the venturi, which gives poor aeration to the liquid.

When the digester 100 is filled with bio-solid containing wastewaters from 25% up to 85% depending upon situation of operation, the suction valve 4 opens first, and then the discharging valves 17, 18, 42, and 43 open. At this stage, venturi air fittings are closed with small valves that can control the amount of oxygen intake into the digester 100 and this procedure prohibits back flow of the bio-solid liquid. It is, however, still safe to let the liquid flow back through a transparent hose 31, a hose 40 and the foam bypass 36, since every hose and pipe are connected from one another making whole system totally closed. The venturi 19 is designated for aeration only and venturi 20, 21 are designated for defoaming and recycling warm air as well.

Right after all valves are open and venturi are closed, then the motor 15 can start from the motor driver 14 that controls motor speed and accordingly pump speed. At the desired speed of the motor 15, the aeration venturi 19 opens fully and then fresh air is sucked into the digester 100 through the transparent hose 31 that is also used as liquid level measure tape with scale. At the same time, the venturi 20 opens up and air in the digester 100 is recycled back to the digester 100. Internal pressure builds up during this procedure requiring a way of removing the pressure even though it is small.

Figure 3:
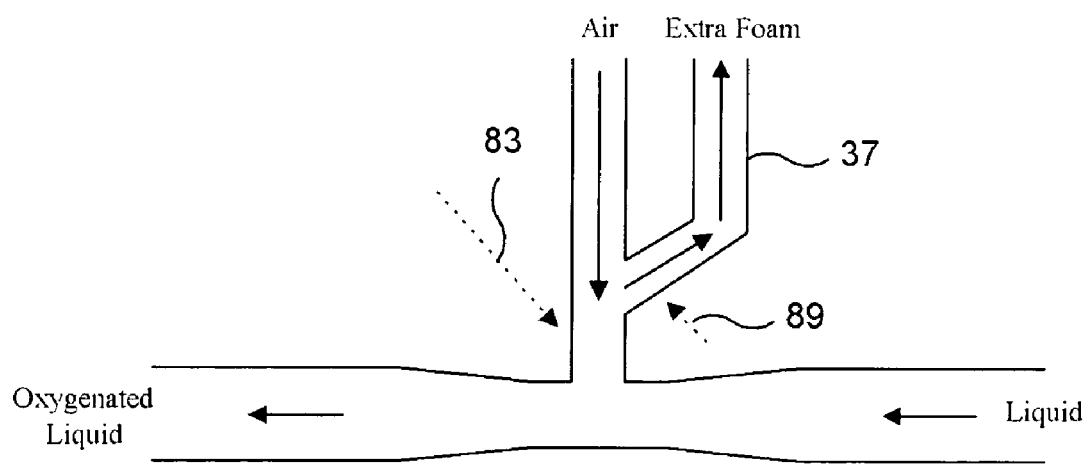
FIG. 3 is a cross sectional view of a modified defoamer venturi for treatment of heavy foam according to an embodiment of the present invention.

Unless a small fitting valve 89 in FIG. 3 opens, the internal pressure as time goes on continues to build up enough to crack all fittings of valves and probe, etc making whole system leak. Therefore, the fitting valve 89 has to be open immediately to release the internal pressure. The venturi 21 is emergency defoaming apparatus that is usually not in use unless necessary.

With continuation of aeration, the temperature goes up above mesophilic range and at most of case foam develops. The level of foam goes up over the initial liquid level 3 and reaches a ceiling. When a first foam sensor 28 contacts foam, then the liquid defoaming apparatus 6 starts spraying liquid from the pump 16 through a pipe 26. At the same time the fitting valve of the venturi 19 closes for the reduction of aeration, which helps the liquid defoaming apparatus 6 destroy foam more efficiently. Under this circumstance, nevertheless, the venturi 20 should be open all the times for the prevention of building-up internal pressure.

However, under a certain situation, very heavy foam develops and will have to be dealt with unless otherwise whole operation is interrupted. When the liquid defoaming apparatus 6 is not able to handle the heavy foam even though light foam can be destroyed by liquid defoaming apparatus or even by blade defoaming apparatus (not shown) run by motor at the top of the digester 100, the heavy foam reaches the ceiling and flows through the foam bypass 36. The heavy foam contacts a second sensor 29 and then the liquid defoaming apparatus 6 stops since its defoaming action is marginal in killing the heavy foam.

The heavy foam flows down the foam bypass 36 and is sucked through the venturi 20 shown in FIG. 3. In case of medium strength of foam, the foams are immediately sucked in through the venturi 20. However, in the situation when the defoamer venturi 20 is not able to handle all foams, extra foam overflows back through a hose 37 and drips down to the foam collector pipe 35.

Foam usually flows down on the surface of the foam collector pipe 35 and are sucked in through the aeration venturi 19 or if necessary through the extra venturi 21. Through a inlet of the foam collector pipe 35 not only extra foam drips down but also fresh air mixed with some gas coming out together with bubbles from a hose 86 are altogether sucked into the digester 100. A desirable size of the foam collector pipe 35 is about 2.5% of total capacity of the digester 100. This optimum size has been confirmed by releasing the internal pressure that fills up the foam collector pipe 35 with bio-solid liquid from inside of the digester 100, which eventually prohibits any spill to the ground. This usually happens only when power fails for some reason. In this case, restarting motor is able to suck in all of the bio-solid liquid in the foam collector pipe 35 and all other liquid filled with in pipes and hoses.

When thermophilic digestion closes to the end, the temperature drops and needs to pump out to the next stage of wastewater treatment process. The digested bio-solid liquid can then be transferred through a sample port valve 13 by external mobile pump to the next tank (not shown). At the same time, the system needs to take fresh new bio-solid containing waste streams for continuous operation of autothermal aerobic digestion treatment. By opening a first valve 46 and closing a second valve 47, the venturi 19 could transfer new fresh untreated wastewaters into the digester 100.

Figure 2:
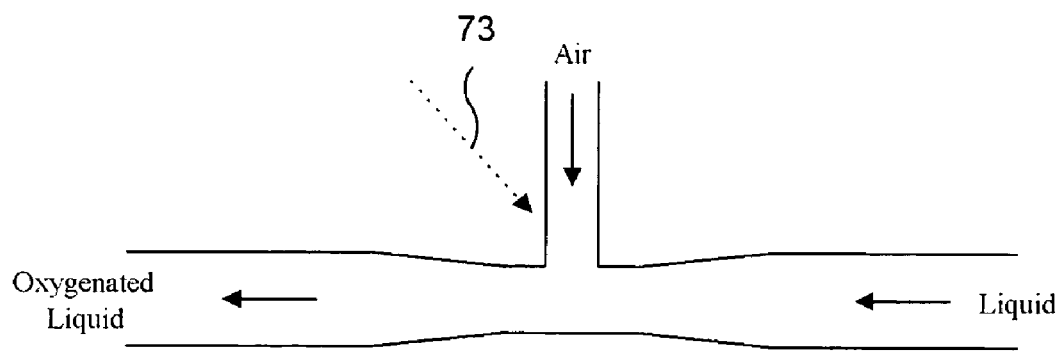
FIG. 2 is a cross sectional view of a regular aerator venturi used in an embodiment of the present invention.

This procedure is able to control not only 100% of heavy foam but also the amount of fresh air and recycled air. Accordingly, this system can control temperature of the digester 100 by adjusting an air fitting valve 73 in FIG. 2 and a fitting valve 83 in FIG. 3, since fresh air drops temperature and recycling air holds the temperature as already confirmed by many group of researchers. This system using a series of venturis and foam collector pipe makes it possible to run totally closed autothermal aerobic digestion system and the whole operation continues to run unless power fails without any spill at all. In addition, almost no odor is released to the environment at all.

This whole system could be run manually, semi automatically or fully automatically depending on the size of treatment plant and purpose of the operation.

According to the present invention, this autothermal aerobic digestion system using a series of venturis and a foam collector pipe makes it possible to perfectly control light and heavy foams.

Also, since all mechanical aeration and defoaming apparatuses are located inside the digester, there is no need of discharge of the digester for repair of mechanical disorder, so that a share for maintenance and repair of the equipment is minimized.

In addition, since mechanical parts installed in the digester are minimized to allow bio-solid materials to be completely mixed, treatment efficiency is enhanced.

Further, since the digestion system is a totally closed autothermal aerobic digestion system, foams do not overflow and almost no odor is released to the environment at all, which permits to exclude the use of the conventional equipment such as air scrubber. Furthermore, whole operation is not stopped except for the case of power failure. Accordingly, this would allow the whole thermophilic digestion system to shorten each cycle of automatic digestion.

Meanwhile, the internal pressure generated in the digester elevates the digestion rate of bio-solid contained in wastewater stream as well as the removal rate of pathogenic microorganisms compared with a system used at atmospheric pressure.

While the present invention has been described in detail, it should be understood that various changes, substitutions and alterations could be made hereto without departing from the spirit and scope of the invention as defined by the appended claims.

What is claimed is:

1. An autothermal aerobic digestion system having closed defoaming system, the digestion system comprising:
   a digester having a corn shaped bottom and an upper lid, the digester being of an insulator;
   a suction valve installed at a bottom of the digester, for discharging wastewater;
   at least two nipples dispersedly installed at an inner side of the digester, for returning the wastewater from the suction valve to the digester for recycling;
   a pump for providing a power for recycling the wastewater through the nipples;
   an aeration venturi and a defoamer venturi connected to the discharging nipples for aeration and defoaming during the recycling of the wastewater;
   a liquid defoaming apparatus or a mechanical defoaming apparatus installed at an upper side of the digester, for primarily getting rid of foam generated in the wastewater;
   a first foam sensor installed at a predetermined level of the inner side of the digester, for driving the defoaming apparatus when the foam contacts the first foam sensor;
   a second foam sensor installed at a level higher than the first sensor, for stopping operation of the defoaming apparatus when the foam contacts the second foam sensor;
   a foam bypass having a passage connected to the second foam sensor, for bypassing the foam when the foam contacts the second foam sensor and having a passage connected to the defoamer venturi;
   a hose for making extra foam overflow therethrough when the defoamer venturi cannot process all of the foams; and
   a foam collector pipe connected to the hose and connected to the aeration venturi for returning the foam to the digester.

2. The autothermal aerobic digestion system of claim 1, wherein the aeration venturi comprises:
   a liquid inlet;
   an air intake;
   an outlet of an air containing liquid; and
   an aeration fitting valve.

3. The autothermal aerobic digestion system of claim 1, wherein the defoamer venturi comprises:
   a liquid inlet;
   an air intake;
   an outlet of an air containing liquid;
   an aeration fitting valve; and
   a foam outlet connected the hose.

* * * * *